United States Patent
Rao et al.

(10) Patent No.: US 10,627,483 B2
(45) Date of Patent: Apr. 21, 2020

(54) METHODS AND APPARATUS FOR VELOCITY DETECTION IN MIMO RADAR INCLUDING VELOCITY AMBIGUITY RESOLUTION

(71) Applicant: Texas Instruments Incorporated, Dallas, TX (US)

(72) Inventors: Sandeep Rao, Bangalore (IN); Karthik Subburaj, Bangalore (IN); Dan Wang, Allen, TX (US); Adeel Ahmad, Richardson, TX (US)

(73) Assignee: TEXAS INSTRUMENTS INCORPORATED, Dallas, TX (US)

(\*) Notice: Subject to any disclaimer, the term of this patent is extended or adjusted under 35 U.S.C. 154(b) by 246 days.

(21) Appl. No.: 15/371,754

(22) Filed: Dec. 7, 2016

(65) Prior Publication Data

US 2018/0011170 A1    Jan. 11, 2018

(30) Foreign Application Priority Data

Jul. 9, 2016 (IN) .............................. 201641023530

(51) Int. Cl.
  *G01S 13/58* (2006.01)
  *G01S 7/35* (2006.01)
  (Continued)

(52) U.S. Cl.
  CPC ............ *G01S 7/354* (2013.01); *G01S 13/343* (2013.01); *G01S 13/42* (2013.01); *G01S 13/92* (2013.01); *G01S 2007/356* (2013.01)

(58) Field of Classification Search
  CPC .. G01S 2007/356; G01S 13/343; G01S 13/42; G01S 13/583; G01S 13/92; G01S 7/352; G01S 7/354
  (Continued)

(56) References Cited

U.S. PATENT DOCUMENTS

| 6,147,638 A | 11/2000 | Rohling et al. |
| 2012/0001791 A1 | 1/2012 | Wintermantel |

(Continued)

FOREIGN PATENT DOCUMENTS

| RU | 2326402 C1 | 6/2008 |
| WO | WO2015197226 A1 | 12/2015 |

OTHER PUBLICATIONS

Song, et al., "Enhancing Doppler estimation via newton interpolation for automotive FMCW radars," IEEE International Conference on Information and Communication Technology Convergence (ICTC) Oct. 22, 2014, pp. 615-616 (2014), The Institute of Electrical and Electronics Engineers, Inc., 3 Park Avenue, 17th Floor, New York, N.Y. 10016-5997, U.S.A. (http://ieeexplore.ieee.org/document/6983228/).

(Continued)

*Primary Examiner* — Timothy A Brainard
(74) *Attorney, Agent, or Firm* — Ebby Abraham; Charles A. Brill; Frank D. Cimino (57) ABSTRACT

In accordance with described examples, a method determines if a velocity of an object detected by a radar is greater than a maximum velocity by receiving on a plurality of receivers at least one frame of chirps transmitted by at least two transmitters and reflected off of the object. A velocity induced phase shift ($\varphi_d$) in a virtual array vector S of signals received by each receiver corresponding to a sequence of chirps (frame) transmitted by each transmitter is estimated. Phases of each element of virtual array vector S are corrected using $\varphi_d$ to generate a corrected virtual array vector $S_c$. A first Fourier transform is performed on the corrected virtual array vector $S_c$ to generate a corrected virtual array spectrum to detect a signature that indicates that the object has an absolute velocity greater than a maximum velocity.

13 Claims, 7 Drawing Sheets

(51) Int. Cl.
*G01S 13/42* (2006.01)
*G01S 13/92* (2006.01)
*G01S 13/34* (2006.01)

(58) Field of Classification Search
USPC .......................................................... 342/104
See application file for complete search history.

(56) References Cited

U.S. PATENT DOCUMENTS

2015/0084808 A1* 3/2015 Vacanti .................. G01S 13/36
342/122
2016/0131752 A1 5/2016 Jansen et al.

OTHER PUBLICATIONS

International Search Report and Written Opinion, PCT/US2017/041366, dated Apr. 12, 2018 (7 pages).
EP Search Report; PCT/US2017041366; dated Jun. 17, 2019; 8 pages.

* cited by examiner

METHODS AND APPARATUS FOR VELOCITY DETECTION IN MIMO RADAR INCLUDING VELOCITY AMBIGUITY RESOLUTION

CROSS-REFERENCE TO RELATED APPLICATIONS

This application claims the benefit under 35 U.S.C. § 119(a) to co-owned India Provisional Patent Application No. 2016/41023530, filed Jul. 9, 2016, entitled "Velocity Ambiguity Resolution Technique for MIMO Radar," naming Rao et. al. as inventors, which is hereby incorporated by reference herein in its entirety.

TECHNICAL FIELD

This relates generally to object detection and velocity determination and, in particular, to velocity detection in Frequency Modulated Continuous Wave (FMCW) radar systems.

BACKGROUND

The basic transmit signal of an FMCW radar is a frequency ramp (also commonly known as a "chirp"). A chirp is a signal whose frequency varies linearly with time. For example, a mm-wave FMCW radar might transmit a chirp having a 4 GHz bandwidth that starts at 77 GHz and linearly ramps up to 81 GHz. The signal transmitted by the transmit (TX) antenna reflects off one or more objects and the reflected signal is received at one or more receive (RX) antennas.

An FMCW radar transmits a series of such equally spaced chirps in a unit called a frame. The corresponding signal received at the RX antennas is down-converted, digitized and then processed to obtain the range, velocity and angle of arrival of multiple objects in front of the radar.

Multiple-Input Multiple Output (MIMO) Radar is a technique to improve the angle estimation capability of FMCW radar. With a MIMO Radar, multiple TX antennas transmit to the same set of RX antennas. The signals emanating from the multiple TX antennas need to be orthogonal (i.e. should not interfere with one another). Some of the common methods of ensuring orthogonality are: Time Division Multiplexing (TDM-MIMO), Frequency Division Multiplexing (FDM-MIMO) and code-phase multiplexing. In TDM-MIMO the signals from the different TX antennas occupy different time slots. In FDM-MIMO the signals from multiple TX antennas are separated in frequency. In code-phase multiplexing, multiple TX antennas simultaneously transmit signals using different pseudo-random noise codes (PN-codes), which enable the signals to be separated at the receiver. FDM-MIMO imposes additional hardware complexity on both the transmit and the receive chain. Code-phase multiplexing results in degraded performance (due to de-spreading noise) and/or significantly increased computational requirements (for decoding intra-chirp code PN sequences).

Consequently, TDM-MIMO has advantages over the other methods for providing orthogonality. However, the TDM-MIMO mode of operation results in a reduction in the maximum unambiguous velocity that can be measured by the radar. Using conventional TDM_MIMO radar, any object moving with a velocity greater than the maximum unambiguous velocity ($v_{max}$) will have its velocity estimated incorrectly.

SUMMARY

In accordance with an example aspect, a method determines if an absolute velocity of an object detected by a radar is greater than a maximum. The method includes receiving on a plurality of receivers at least one frame of chirps transmitted by at least two transmitters and reflected off the object. An estimate is made of the velocity induced phase shift ($\varphi_d$) in a virtual array vector S. S is computed based on signals received by each receiver corresponding to a sequence of chirps (frame) transmitted by the transmitters. Phases of each element of virtual array vector S are corrected using $\varphi_d$ to generate a corrected virtual array vector $S_c$. A first Fourier transform on the corrected virtual array vector $S_c$ generates a corrected virtual array spectrum, and the corrected virtual array spectrum is analyzed to detect a signature that indicates that the object has an absolute velocity greater than a maximum velocity.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

Figure 1:
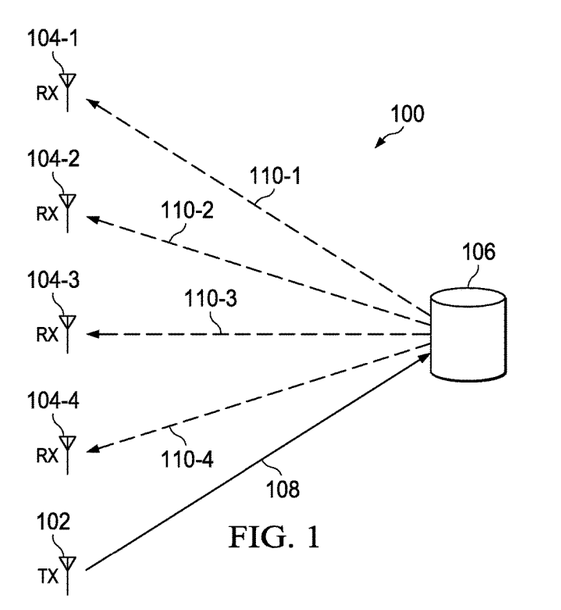
FIG. 1 is a schematic diagram of an FMCW radar.

FIG. 1 is a schematic diagram of an FMCW radar 100. In FIG. 1, the radar 100 is arranged with a single transmitter 102 transmitting a frame 108 as described below regarding FIG. 2. The frame 108 reflects off object 106 with the reflected signals 110-1-110-4 received by 4 receivers 104-1-104-4, respectively. With a single TX antenna transmitting a frame of chirps to a single RX antenna, the relative motion of an object with respect to the radar induces a phase change ($\varphi_d$) in the received signal across subsequent chirps. Each antenna is driven by circuitry that may be partially or wholly incorporated into an integrated circuit. For example, an integrated circuit may generate the signals and apply the signals to the antenna using one or more power transistors or power modules. The driving circuitry may be discrete components or several components incorporated into a module. In some configurations, one integrated circuit may drive multiple antennas. In other configurations, a separate circuit drives each antenna and a common processor to analyze the signals.

Figure 2:
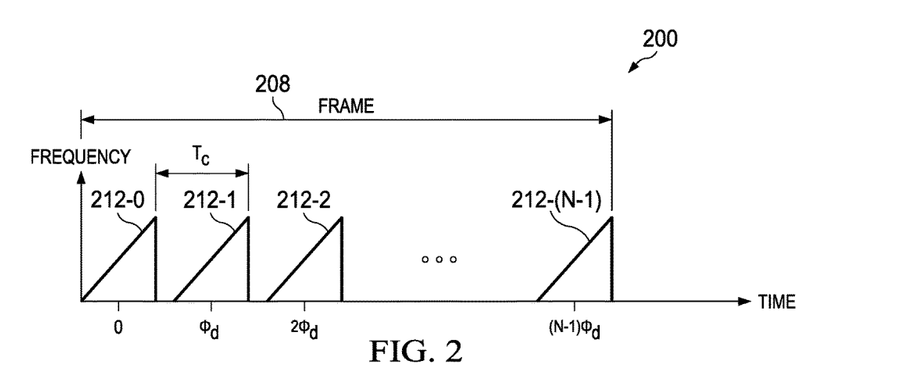
FIG. 2 is a graph of a chirp signal.

FIG. 2 is a graph 200 of the chirp signal received on an RX antenna. Received chirp 212-0 is the reference chirp and the first chirp in frame 208. Received chirp 212-1 is shifted $\varphi_d$ by the Doppler effect from its timing as transmitted. Received chirp 212-2 is shifted $2\varphi_d$ from its timing as transmitted. Thus, there is a linear progression ([0, $\varphi_d$, $2\varphi_d$ ... (N-1) $\varphi_d$]) of the phase of the received signal across chirps. This phase progression will be seen in the corresponding peaks of a range-FFT (further explained hereinbelow) across chirps, when the range-FFT is performed on digitized samples corresponding to the received IF signal for each chirp. This sequence is depicted in FIG. 2 (For simplicity, here and elsewhere in this document, the initial phase value is referred to as zero). The linear progression in the phase of the received signal allows for estimation of $\varphi_d$ using a Fourier transform across subsequent chirps. The estimation can be accomplished using fast Fourier transform (FFT) devices and techniques on the received signal across subsequent chirps. The phase change $\varphi_d$ is directly proportional to the velocity of the object, which is given by Equation 1:

$$\varphi_d = \frac{4\pi T_c v}{\lambda} \quad [1]$$

where $T_c$ is the chirp periodicity (i.e. time from start of one chirp to the next) and $\lambda$ is the wavelength corresponding to the start frequency of the chirp.

Thus, after $\varphi_d$ has been estimated (for example, by using an FFT), the velocity of the object can be estimated as $v_{est}$ using Equation 2:

$$v_{est} = \frac{\varphi_d \lambda}{4\pi T_c} \quad [2]$$

The parameter $\varphi_d$ is a phase quantity that can only be unambiguously estimated if it lies between $-\pi$ and $\pi$ radians. The limit on $\varphi_d$ directly imposes a limit on the value of the maximum velocity ($v_{max}$) that can be unambiguously estimated. Substituting $\varphi_d=\pi$ in equation [2] gives Equation 3, which yields the following value of $v_{max}$.

$$v_{max} = \frac{\lambda}{4T_c} \quad [3]$$

Figure 3:
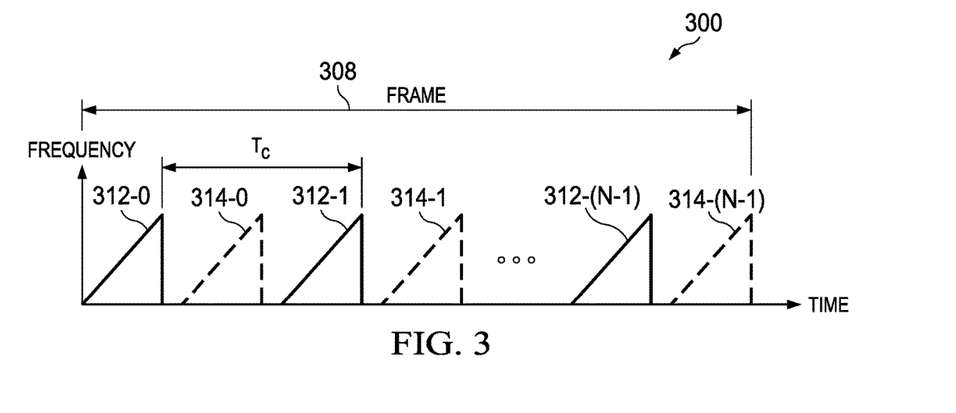
FIG. 3 is a graph of an interleaved chirp signal.

Thus, the maximum unambiguous velocity ($\pm v_{max}$) that can be measured by the radar directly depends on the chirp period $T_c$. A smaller $T_c$ yields a higher $v_{max}$. The periodicity $T_c$ refers to the time between the start (or any corresponding point) of consecutive chirps from the same TX antenna. So, all other aspects being equal, the $v_{max}$ for a TDM-MIMO radar configuration with two TX antennas would be half that of the single TX radar configuration. FIG. 3 illustrates this point in frame 308. Graph 300 includes chirps 312-0-312-(N-1) that are transmitted by one transmitter (TX) and are interleaved in time with chirps 314-0-314-(N-1) from a second transmitter. $T_c$ is the period of chirps from one transmitter. FIG. 3 illustrates the period, where $T_c$ is measured from the end of chirp 312-0 to the end of chirp 312-1. In contrast with a single transmitter TDM-MIMO as illustrated in FIG. 2 where $T_c$ runs from the end of chirp 212-0 to the end of chirp 212-1, the period $T_c$ in FIG. 3 is twice as long. In general, a TDM-MIMO system with M transmitters has a period M times the period of a single transmitter system. However, as noted above in equation [3], $v_{max}$ is inversely proportional $T_c$. Thus, the greater the number of transmit antennas that are used, the lower the maximum velocity $v_{max}$.

In FIG. 1, the object 106 is directly in front of transmitter 102 and receivers 104-1-104-4. This example is a special case where, because the object is at a position perpendicular to the TDM-MIMO array, the received chirps will arrive at all the receivers essentially at the same time. Most objects being detected are at an angle relative to the TDM-MIMO system.

Figure 4:
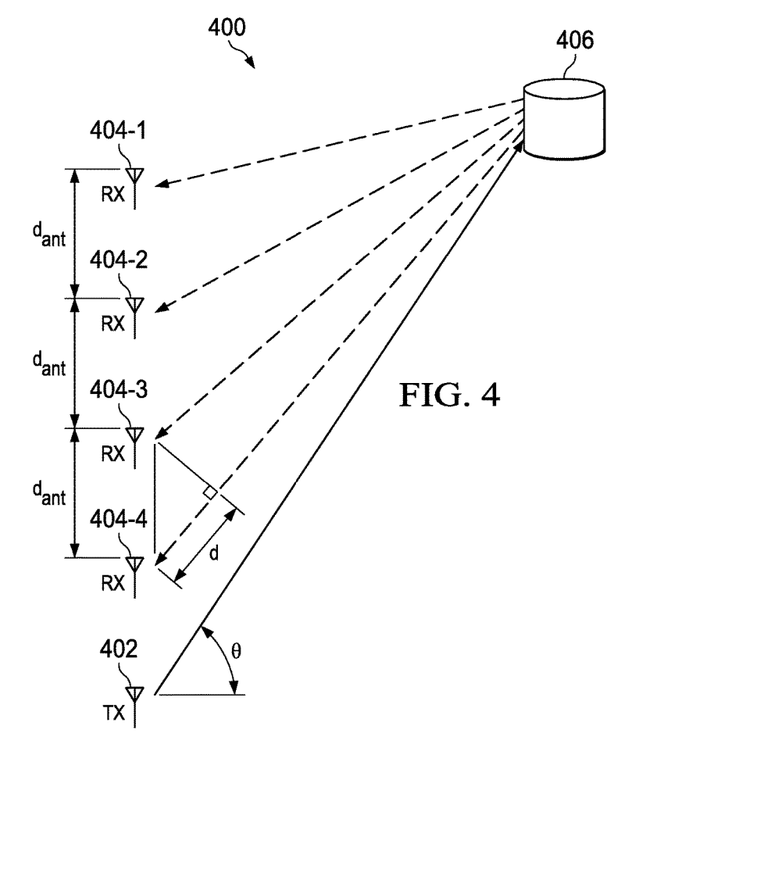
FIG. 4 is a schematic diagram of another radar.

FIG. 4 is a schematic diagram of another radar 400. Elements in FIG. 4 that are numbered in a similar manner to elements in FIG. 1 perform similar functions. For example, elements 402, 404-1-404-4 and 406 perform similar functions to elements 102, 104-1-104-4 and 106 in FIG. 1. In FIG. 4, object 406 is at an angle θ relative to transmitter (TX) 402 and receivers (RX) 404-1-404-4. A signal transmitted from transmitter 402 reflects off an object 406 and receivers 404-1-404-4 receive the signal. Receivers 404-1-404-4 have uniformly spaced antennas having a spacing $d_{ant}$. The signal arriving at each successive RX antenna is delayed with respect to the previous antenna due to the additional distance d that the signal must traverse; this situation is illustrated by the right triangle between receivers 404-3 and 404-4 in FIG. 4. This additional delay translates to a phase difference $\varphi_a$ between the signal arriving at adjacent RX antennas. There is thus a linear progression in the phase of the signal arriving at successive RX antennas [0, $\varphi_a$, $2\varphi_a$, $3\varphi_a$]. This linear progression allows for estimation of $\varphi_a$ using, for example, an FFT. The phase difference across antennas $\varphi_a$ relates to the angle of arrival (θ) of the object. Having estimated $\varphi_a$, the angle of arrival θ can be estimated using Equation 4:

$$\theta = \sin^{-1} \frac{\varphi_a \lambda}{2\pi d_{ant}} \quad [4]$$

Where $d_{ant}$ is the distance between adjacent RX antennas.

Figures 5, 9:
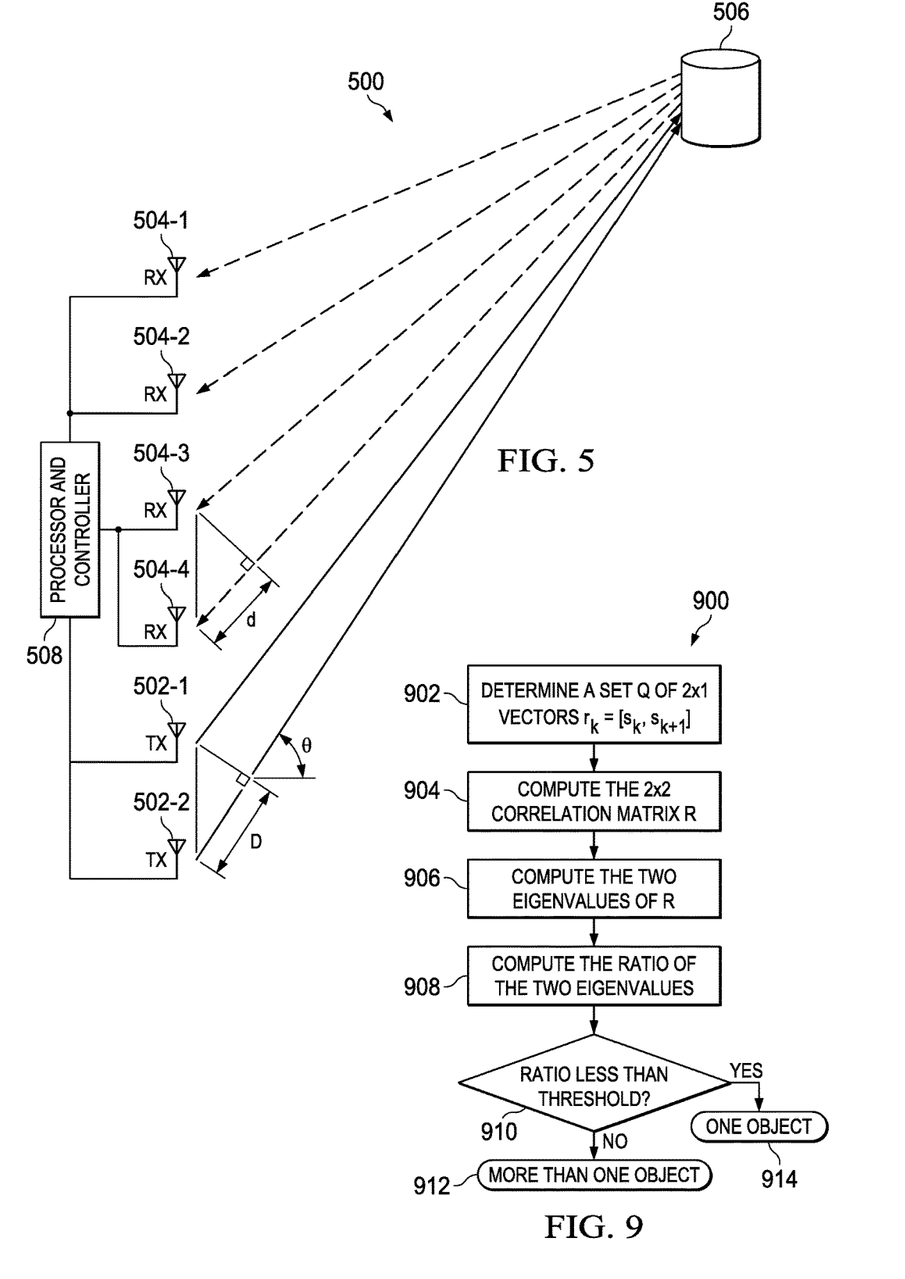
FIG. 5 is a schematic diagram of a radar system having two transmitters.
FIG. 9 is a flow diagram of another method aspect of the present application.

FIG. 5 is a schematic diagram of a TDM-MIMO system 500 having two transmitters 502-1 and 502-2. Elements in FIG. 5 numbered in a similar manner to elements in FIG. 4 perform similar functions. For example, elements 502, 504-1-504-4 and 506 perform similar functions to elements 402, 404-1-404-4 and 406 in FIG. 4. Controller and processor 508 controls transmitters 502-1 and 502-1 and receivers 504-1-504-4 and processes signals received on receivers 504-1-504-4. Controller and processor 508 may partially or wholly incorporated into an integrated circuit or integrated circuits. For example, an integrated circuit may generate the signals and apply the signals to the antenna using one or more power transistors or power modules. The driving circuitry may be discrete components or several components incorporated into a module. In some configurations, one integrated circuit may drive multiple antennas. In other configurations, a separate circuit drives each antenna and a common processor to analyze the signals. In some configurations, the controller portion and the processor portion are formed in the same integrated circuit or may be separate integrated circuits. The processor portion of the integrated circuit may include a CPU, a digital signal processor (DSP), a mixed signal processor (MSP), a reduced instructions set computer (RISC) core such as an ARM core, a microcontroller, or another suitable processor.

A TDM-MIMO system like system 500 uses multiple transmitters to increase the effective length of the linear phase progression of $\varphi_a$ and thus improve the quality of angle estimation. FIG. 5 illustrates the use of multiple transmitters and the effect of the angle estimation. Note that the signal from transmitter 502-2 must travel an additional distance D with regard to transmitter 502-1. This additional distance that chirps transmitted from transmitter 502-2 must travel relative to chirps transmitted from transmitter 502-1 contributes an additional phase difference to the signal at each of the receiver antennas. In FIG. 5, the spacing between transmitters 502-1 and 502-2 is chosen to be four times the spacing between adjacent receiver antennas. However, the principles described herein apply to any spacing between the transmitters. Proportionally, this additional phase difference works out to be $4\varphi_a$. Thus, for each receiver antenna, the signal seen by the receiver from transmitter 502-1 and transmitter 502-2 has a phase difference of $4\varphi_a$. With this configuration, system 500 operates as follows:
  a. First, transmitter 502-1 transmits and the phase seen at receivers 504-1-504-4 is [0 $\varphi_a$ 2$\varphi_a$ 3$\varphi_a$], respectively.
  b. Subsequently, transmitter 502-2 transmits and the phase seen at receivers 504-1-504-4 is [4$\varphi_a$ 5$\varphi_a$ 6$\varphi_a$ 7$\varphi_a$].

The received signal obtained from consecutive transmission from transmitter 502-1 and transmitter 502-2 can be concatenated together to create a longer signal sequence whose phase has the following linear progression: P=[0 φa 2φa 3φa 4φa 5φa 6φa 7φa], which provides a better estimation of $\varphi_a$. Thus, in TDM-MIMO, signals received at the RX antenna array due to time division multiplexed transmissions across multiple TX antennas can be suitably sequenced to create a signal sequence whose length is equal to: the Number_of_transmit_antennas X Number_of_receive_antennas. This signal sequence is referred to herein as the "virtual array signal." Herein, the virtual array signal itself is denoted S, and the phase corresponding to this sequence is denoted by P.

One process for generating the virtual array signal first involves two dimensional FFT (2D-FFT) processing for each transmit/receiver pair as explained below. An Intermediate Frequency (IF)-signal is obtained by mixing the transmitted chirp with the corresponding received chirp. A range-FFT is performed on the digitized samples corresponding to the IF signal. The range-FFT resolves objects in range and produces a series of bins each bin corresponding to a range value. A signal at a bin indicates an object at that range. This processing is done for each chirp on each transmitter/receiver pair for an entire frame. For each transmitter/receiver pair, a Doppler-FFT is then performed for each range-bin across chirps. This 2D-FFT (i.e., range-FFT followed by a Doppler-FFT) processing generates a two dimensional FFT grid and one such 2D-FFT grid is generated for each transmitter/receiver pair. The virtual array signal S is then generated by picking a signal sample corresponding to a specific range-Doppler bin across all the generated 2D-FFT grids for every receiver transmitter pair (see, e.g., Song, et al., "Enhancing Doppler estimation via newton interpolation for automotive FMCW radars", International Conference on Information and Communication Technology Convergence (ICTC) 2014, pp. 615-616 (2014), which is incorporated by reference in its entirety herein).

Figure 6:
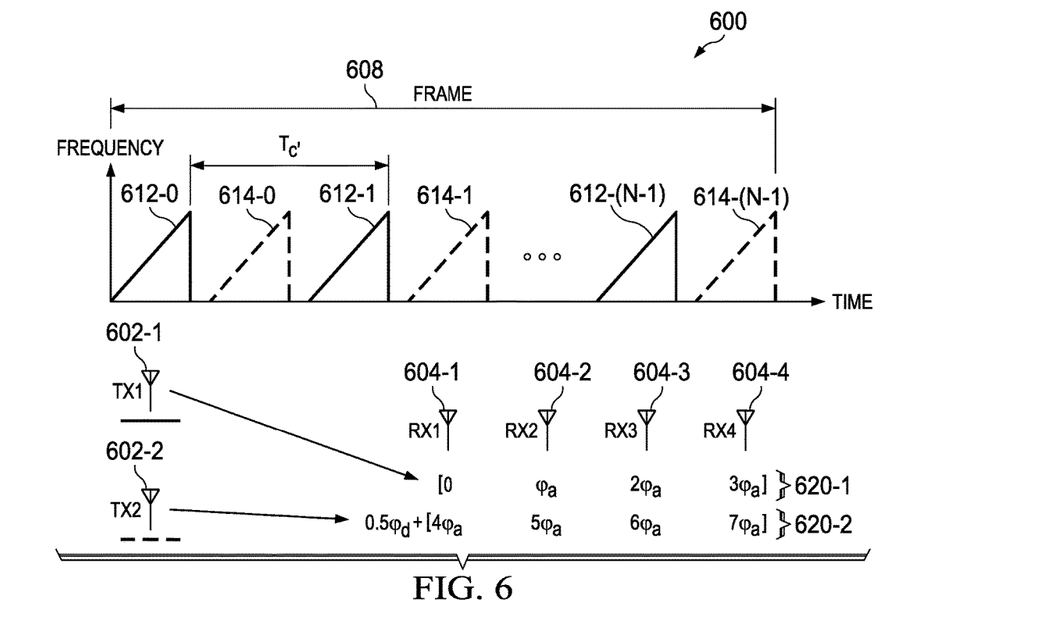
FIG. 6 is a graph showing the combined impact of velocity and angle of arrival.

FIG. 6 is a graph 600 showing the combined impact of velocity and angle of arrival. Elements in FIG. 6 numbered in a similar manner to elements in FIG. 5 perform similar functions. For example, chirps 612-0-612-(N−1) and chirps 614-0-614-(N−1) perform similar functions to chirps 312-0-312-(N−1) and chirps 314-0-314-(N−1) in FIG. 3. The discussion hereinabove with respect to FIG. 5 implicitly assumes a stationary object. For an object with relative motion with respect to the radar, the phase offset seen at the receivers will have a contribution due to both the relative velocity and angle of arrival. Regarding FIG. 6, $T_c'$ refers to the time between the start of successive chirps from the same transmit antenna. Also, $\varphi_d$ refers to the velocity induced phase difference at the receiver between consecutive chirps emanating from the same transmit antenna. Thus, the corresponding velocity induced phase difference between adjacent transmissions from transmitters 602-1 and 602-2 (FIG. 5) is $0.5\varphi_d$. When transmitter 602-1 transmits, the phase of the received signal at the four receivers 604-1-604-4 is [0 $\varphi_a$ 2$\varphi_a$ 3$\varphi_a$], respectively, as shown in set 620-1. For a signal emanating from transmitter 602-2, the signal at the four receivers 604-1-604-4 has an angle of arrival induced phase-offset of [4$\varphi_a$ 5$\varphi_a$ 6$\varphi_a$ 7$\varphi_a$]. Because transmissions from transmitter 602-2 are delayed from transmitter 602-1 by $0.5T_c$, this induces an additional phase of $0.5\varphi_d$ as shown in set 620-2. Thus, the phase P of the virtual array signal S that incorporates the effect of both the angle of arrival and the relative velocity is given by Equation 5:

$$P=[0\ \varphi_a\ 2\varphi_a\ 3\varphi_a\ 0.5\varphi_d+4\varphi_a\ 0.5\varphi_d+5\varphi_a\ 0.5\varphi_d+6\varphi_a\ 0.5\varphi_d+7\varphi_a] \quad [5]$$

As seen in equation [5], the phase P of the virtual array signal S depends on both the angle of arrival (via $\varphi_a$) and the relative velocity (via $\varphi_d$). Estimation of velocity and angle of arrival are thus coupled. Determining velocity and angle of arrival can be determined using the following technique:
  a. Step 1
  Estimate the Relative Velocity Induced Phase ($\varphi_d$)
  Determine the phase differences ($\varphi_d$) at each RX antenna due to successive chirps transmitted by a specific TX antenna. This processing is sometimes called "Doppler FFT processing". This is done by FFT processing the signal received at an RX antenna due to chirps transmitted from a specific TX antenna. Note that, typically, a range-FFT is first done on the ADC samples corresponding to each chirp, prior to performing the "Doppler-FFT across chirps in a frame. The estimate of $\varphi_d$ is used to estimate the velocity v of the object using equation [2]. In practice, similar processing is repeated across all TX-RX antenna pairs and the results averaged to yield a better estimate of $\varphi_d$ (e.g., the Doppler FFTs across multiple TX-RX antenna pairs may be non-coherently averaged and this non-coherently averaged FFT is then used to estimate $\varphi_d$.)
  b. Step 2
  Doppler Correction
  The estimate of $\varphi_d$ in Step 1 is used to remove the dependence of the virtual array signal S on $\varphi_d$ by multiplying the last four elements of S by $$e^{-j\left(\frac{\varphi_d}{2}\right)}.$$

This operation creates a corrected virtual array signal $S_c$, whose phase $P_c$) is given by Equation 6:

$$P_c=[0\ \varphi_a\ 2\varphi_a\ 3\varphi_a\ 4\varphi_a\ 5\varphi_a\ 6\varphi_a\ 7\varphi_a] \quad [6]$$

c. Step 3

Angle Estimation

From equation [6], the phase $P_c$ of the corrected virtual array signal $S_c$ has a linear progression in $\varphi_a$. An FFT on $P_c$ will thus yield an estimate of $\varphi_a$. This estimate of $\varphi_a$ is used in equation [4] to determine the angle of arrival θ.

The technique above assumes that the relative velocity of the object (v) was within $v_{max}$ (i.e. $|v|<v_{max}$). Any violation of this constraint would result in an erroneous estimate of $\varphi_d$ and consequently errors in the estimated velocity (v) and in $S_c$ (and its phase $P_c$). Also, as noted hereinabove, the achievable $v_{max}$ is inversely proportional to the number of transmitters (e.g., by a factor of 2 for two transmitters) because $T_c$ increases proportionally to the number of transmitters.

In an aspect, the limitation of $v_{max}$ as stated above is ameliorated in TDM-MIMO radar. The following process is used. If $|v|$ exceeds $v_{max}$, then errors in the estimate of $\varphi_d$ also effect the Doppler correction (Step 2 hereinabove) that was done prior to angle estimation (Step 3 hereinabove). The errors thus introduced in the phase $P_c$ of the corrected virtual array signal $S_c$ result in unique signatures in its angle-FFT spectrum. These signatures are detected and used to correct for a condition where $|v|$ has exceeded $v_{max}$ as further explained hereinbelow.

If $|v|>v_{max}$, then $|\varphi_d|$ will exceed π resulting in an erroneous estimate of $\varphi_d$ in Step 2 of the method described above. For example, if $\varphi_d$ exceeds π (i.e., $\varphi_d=\pi+\Delta$), the value of $\varphi_d$ estimated in Step 1 ($\varphi_{d\_est}$) will be $-\pi+\Delta$. Likewise; if the value of $\varphi_d$ is less than $-\pi$ (i.e., $\varphi_d=-\pi-\Delta$), then $\varphi_{d\_est}=\pi-\Delta$. Thus, the estimation error $\varphi_d-\varphi_{d\_est}=\pm 2\pi$. This estimation error results in an error in the phase of $P_c$, the erroneous phase is given by Equation 7:

$$P_c=[0, \varphi_a\ 2\varphi_a\ 3\varphi_a\ \pi+4\varphi_a\ \pi+5\varphi_a\ \pi+6\varphi_a\ \pi+7\varphi_a] \quad [7]$$

In Equation 7, the error terms are n added to each of the last four entries. Thus, a vector of the error ("phase error vector") for this radar architecture is $\varphi_{error}=[0\ 0\ 0\ 0\ \pi\pi\pi\pi]$.

Figure 7:
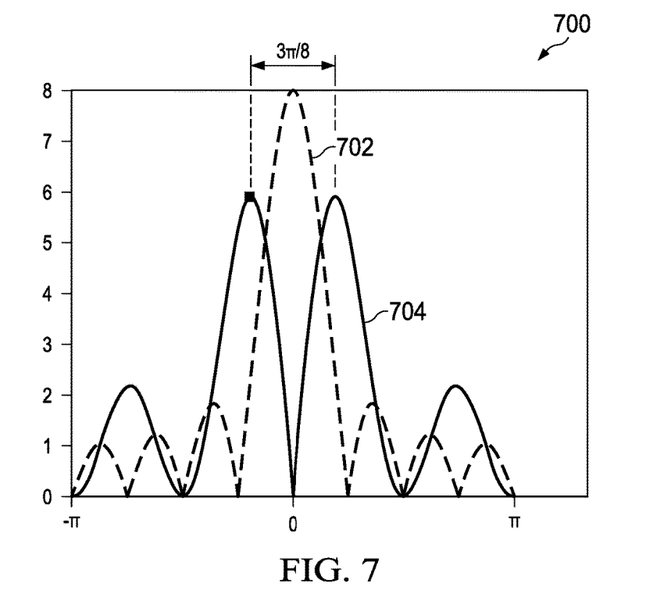
FIG. 7 is a graph showing Fourier transforms of an ideal and an erroneous corrected matrix.

FIG. 7 is a graph 700 showing the FFT of an ideal $S_c$ (i.e. where v is less than $v_{max}$) and of an $S_c$ having the phase error shown above in equation [7]. The ideal corrected virtual array signal $S_c$ (i.e. with its phase $P_c$ denoted by equation [6]), results in curve 702 with a single peak in the angle-FFT (corresponding to the estimate of $\varphi_a$ and thus θ). An erroneous $S_c$ (i.e. with the phase $P_c$ denoted by equation [7]) instead results in curve 704 that has two peaks in its angle-FFT. Further the two peaks in the FFT spectrum are separated by 3π/8 radians and have equal power. Thus, any angle-FFT that displays the properties of 1) two peaks and 2) the peaks are separated by 3π/8 has a high likelihood of being indicative of a situation where $|v|$ has exceeded $v_{max}$. Therefore, an over $v_{max}$ condition can be determined using the following checks:

1) Check 1: Does the FFT of $S_c$ have two peaks of equal power that are separated by 3π/8 radians from each other?
2) Check 2: If check one is positive, negate the last 4 samples of $S_c$ and re-compute the angle-FFT. Since negating a sample is equivalent subtracting π from its phase, this restores the erroneous phase (equation [7]) to the ideal phase (equation [6]).
3) Check 3: Confirm that the FFT resulting from Check 2 has a single peak that is located midway and equidistant from the two peaks of the erroneous angle-FFT.
4) Check 4: If checks 1-3 are passed, then perform an additional check to ensure that the two peaks are not due to the presence of two objects in the same range-Doppler bin (in the 2D-FFT grid). A procedure for this is described hereinbelow.
5) Check 5: If checks 1-4 are passed, then a velocity excursion beyond $v_{max}$ is flagged. True velocity is computed using Equation 8:

$$v_{true}=v_{est}+2v_{max}\ (\text{if } v_{est}<0) \text{ or } v_{true}=v_{est}-2v_{max}\ (\text{if } v_{est}>0) \quad [8]$$

Figure 8:
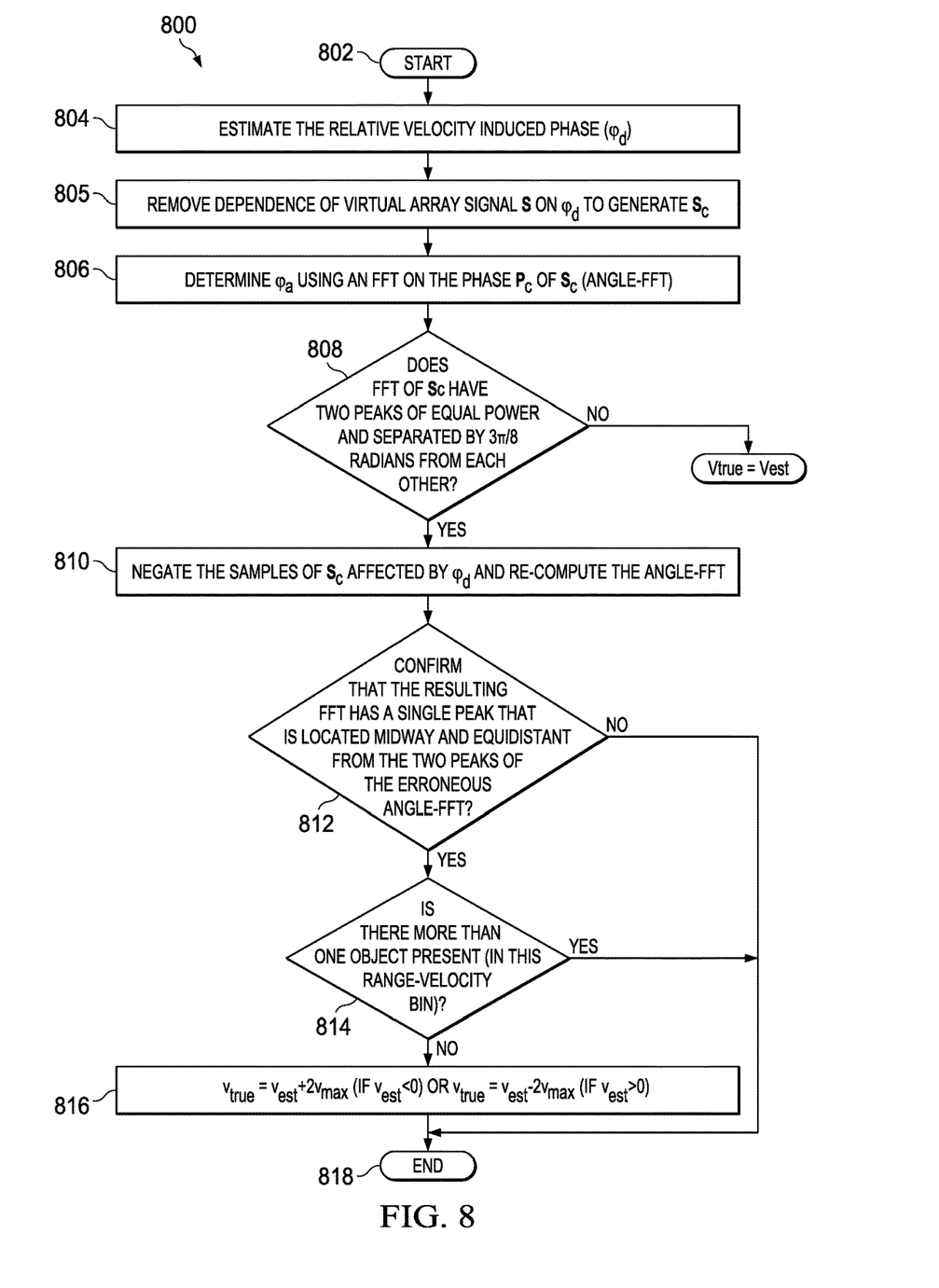
FIG. 8 is a flow diagram of a method aspect of the present application.

FIG. 8 is a flow diagram of an aspect method 800. Method 800 starts with step 802. In step 804, an estimate of the Doppler phase shift $\varphi_d$ is determined using Doppler FFT processing as described hereinabove. Step 805 removes the dependence of the virtual array signal S by, for example, multiplying the last four elements of S by $$e^{-j\left(\frac{\varphi_d}{2}\right)}.$$

Step 806 determines $\varphi_a$ using the angle FFT processing as described hereinabove. Step 808 determines if the FFT of $S_c$ has two peaks that are separated by 3π/8 radians. (In practice the separation between the two FFT peaks may be subtracted from 3π/8 and the absolute value of this difference is compared against an SNR based threshold.) If not, determine the velocity directly from $\varphi_d$ and no $v_{est}$ adjustment is necessary. If the FFT of $S_c$ has two peaks that are separated by 3π/8 radians, step 810 negates the samples of $S_c$ affected by $\varphi_{error}$ and the angle FFT is recomputed. Step 812 confirms that the recomputed angle FFT has a single peak midway between the peaks of the erroneous angle FFT. For other architectures (i.e. not two transmitters and four receivers) $|v|>v_{max}$ causes other error signatures. Thus, for these other architectures, other error signatures characteristic of the other architecture are detected in step 808 and 812. If the error appropriate signature is not found, an accurate velocity cannot be determined from this data and the process ends with step 818. If the appropriate signature is found, a determination must be made in step 814 if the two peaks were caused by one object using the method described hereinbelow regarding FIG. 9. If only one object is present in the bin, then the formulae shown in step 816 (equations [8]) determines the true velocity $v_{true}$. The method ends with step 818. If more than one object is detected, the process ends without result with step 818.

Check 4 (step 814) hereinabove uses a single object confirmation method that can be used to confirm that the dual-peaks (curve 704) correspond to single object (with an erroneous phase) and is not due to the presence of two objects in the same range-Doppler bin. This can be determined using an eigenvalue based method and relying on the following fact: for a single object, the eigenvalues of the 2×2 correlation matrix corresponding to the corrected virtual array signal $S_c$, will have a single dominant eigenvalue. The corrected virtual array signal $S_c$ is an 8 element vector, with the elements 1-4 corresponding to the received signal at the four antennas from TX1 and the elements 5-8 corresponding to the received signals from TX2 as shown in Equation 9:

$$S_c = [\underbrace{s_1\ s_2\ s_3\ s_4}_{TX1}\ \underbrace{s_5\ s_6\ s_7\ s_8}_{TX2}] \quad [9]$$

The following method determines if one or two objects is present in the same range-Doppler bin:

1. Determine a set Q of 2×1 vectors $r_k=[s_k, s_{k+1}]$ consisting of adjacent elements from $S_c$ and that correspond to the same TX antenna. Thus, $r_1=[s_1\ s_2]$ is part of set Q, while $r_4=[s_4\ s_5]$ is not included in Q because $s_4$ is a signal received from TX1 and $s_5$ is a signal that is received from TX2.
2. Compute the 2×2 correlation matrix $R=\Sigma_Q r_k r_k^T$ where $r^T$ is the transpose of r.
3. Compute the two eigenvalues of R. Computation of the two eigenvalues is a known mathematical process that only requires solving a quadratic equation, for which a computationally simple closed form solution exists.
4. Compute the ratio of the two eigenvalues (ratio of the smaller eigenvalue to the larger eigenvalue). Compare this ratio to a signal-to-noise ratio (SNR) threshold. The signal contains "one object" if ratio is less than the threshold or "more than 1 object" if ratio is more than threshold. The SNR threshold is determined experimentally or can be mathematically derived from the characteristics of the radar system.

FIG. 9 is a flow diagram of an aspect method 900. Method 900 determines if more than one object is in a range-Doppler bin. Step 902 determines a set of 2×1 vectors that do not span transmitters as discussed hereinabove. A 2×2 correlation matrix is then determined from the set of vectors in step 904. Step 906 computes the eigenvalues of the correlation matrix and step 908 computes the ratio of these eigenvalues. Step 910 determines, based on a comparison of a ratio of the eigenvalues to a noise threshold, if there is more than one object (912) or one object (914).

The example techniques described hereinabove are directed to the two transmitter (2TX) by four receiver (4RX) architecture of FIG. 5. However, the aspects of this application have wider applicability. In the aspects of the present application, exploiting the phase errors in the corrected virtual array signal may be used in many architectures. In the 2TX×4 RX case the error ($\varphi_{error}$) in the phase $P_c$ of the corrected virtual array signal $S_c$ includes an additional phase of π in its last 4 elements. FIG. 7 illustrates the corresponding error signatures in the FFT spectrum. Other architectures can have different errors $\varphi_{error}$ error in the phase $P_c$ of the corrected virtual array signal $S_c$ and correspondingly different signatures in the FFT spectrum.

Figure 10:
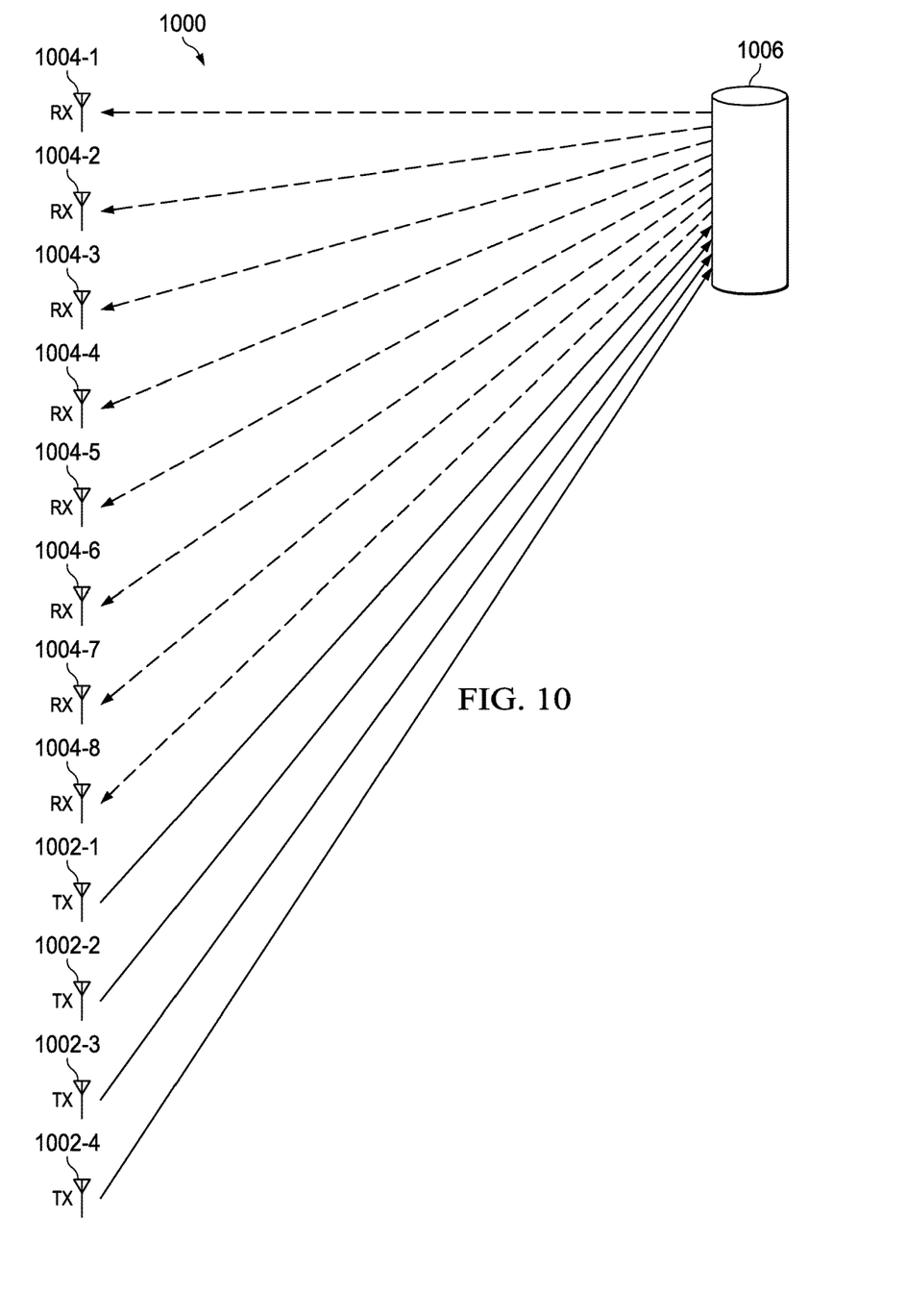
FIG. 10 shows a TDM-MIMO radar system having another architecture.

For example, FIG. 10 shows a TDM-MIMO system 1000 having another architecture including 4 TX antennas (1002-1-1002-4) and 8 RX antennas (1004-1-1004-8). System 1000 is detecting, among other data, the angle and velocity of object 1006. In practice, such an architecture is usually realized by cascading multiple radar chips to increase the availability of TX/RX antennas.

With 4 TX and 8 RX antennas the corrected virtual array signal would consist of 8×4=32 samples. The ideal phase of corrected virtual array signal for the architecture of FIG. 10 is a linear phase progression of length 32 as shown in Equation 9:

$$P_c=[0\ \varphi_a\ 2\varphi_a\ 3\varphi_a\ \ldots\ 32\varphi_a]\quad [9]$$

An excursion in the positive direction (i.e., $v>v_{max}$) results in the following erroneous $P_c$ given by Equation 10:

$$P_c 32\ [0\ \varphi_a\ 2\varphi_a\ 3\varphi_a\ 4\varphi_a\ 5\varphi_a\ 6\varphi_a\ 7\varphi_a\ (\pi/2)+8\varphi_a$$
$$(\pi/2)+9\varphi_a\ (\pi/2)+10\varphi_a\ (\pi/2)+11\varphi_a\ (\pi/2)+12\varphi_a$$
$$(\pi/2)+13\varphi_a\ (\pi/2)+14\varphi_a\ (\pi/2)+15\varphi_a\ \pi+16\varphi_a$$
$$\pi+17\varphi_a\ \pi+18\varphi_a\ \pi+19\varphi_a\ \pi 20\varphi_a\ \pi+21\varphi_a\ \pi+22\varphi_a$$
$$\pi+23\varphi_a\ (-\pi/2)+24\varphi_a\ (-\pi/2)+\mathbf{25}\varphi_a\ (-\pi/2)+26\varphi_a$$
$$(-\pi/2)+27\varphi_a\ (-\pi/2)+28\varphi_a\ (-\pi/2)+\mathbf{29}\varphi_a\ (-\pi/2)+$$
$$30\varphi_a\ (-\pi/2)+31\varphi_a].\quad [10]$$

Similarly, an excursion in the negative direction (i.e., $v<-v_{max}$) results in the following erroneous $P_c$ given by Equation 11:

$$P_c=[0\ \varphi_a\ 2\varphi_a\ 3\varphi_a\ 4\varphi_a\ 5\varphi_a\ 6\varphi_a\ 7\varphi_a\ (-\pi/2)+8\varphi_a\ (-\pi/2)+9\varphi_a\ (-\pi/2)+10\varphi_a\ (-\pi/2)+11\varphi_a\ (-\pi/2)+12\varphi_a\ (-\pi/2)+13\varphi_a\ (-\pi/2)+14\varphi_a\ (-\pi/2)+15\varphi_a\ \pi+16\varphi_a\ \pi+17\varphi_a\ \pi+18\varphi_a\ \pi+19\varphi_a\ \pi+20\varphi_a\ \pi+21\varphi_a\ \pi+22\varphi_a\ \pi+23\varphi_a\ (\pi/2)+24\varphi_a\ (\pi/2)+\mathbf{25}\varphi_a\ (\pi/2)+26\varphi_a\ (\pi/2)+27\varphi_a\ (\pi/2)+28\varphi_a\ (\pi/2)+\mathbf{29}\varphi_a\ (\pi/2)+30\varphi_a\ (\pi/2)+31\varphi_a].\quad [11]$$

Figure 11:
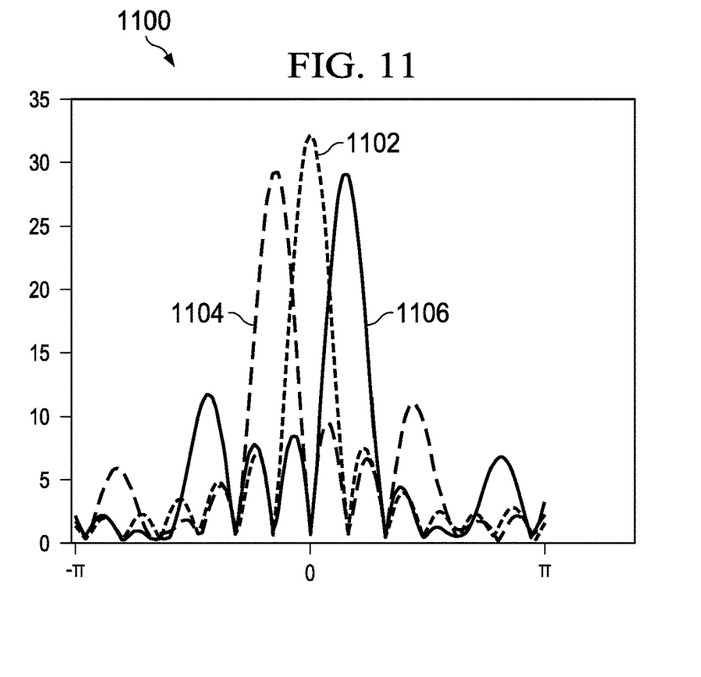
FIG. 11 is a graph showing Fourier transforms of an ideal and an erroneous corrected matrix for the architecture of FIG. 10.

The corresponding signatures in the FFT spectrum of $S_c$ are shown in graph 1100 of FIG. 11. Curve 1102 is an ideal (no excursion) spectrum. Curve 1104 is a spectrum where $v>v_{max}$. Curve 1106 is a spectrum where $v<-v_{max}$.

Thus, an aspect method is more generally described as follows:

1. Estimate the relative velocity induced phase across chirps ($\varphi_d$).
2. Correct the phases of the virtual array signal S using $\varphi_d$ to generate a corrected virtual array signal $S_c$.
3. If $|v|>|v_{max}|$ then the phase $P_c$ of $S_c$ will have an error ($\varphi_{error}$) that induces specific signatures in the spectrum of $S_c$
4. Perform an FFT on $S_c$ and analyze the spectrum to detect the signatures that indicate that $|v|>|v_{max}|$.
    a. Additional checks may involve: multiplying $S_c$ element by element with $e^{-j\varphi_{error}}$ and performing an FFT on the resulting signal to determine a corrected $\varphi_a$.
    b. Perform additional computations on $S_c$ to determine if multiple objects may be causing the signature.

Figure 12:
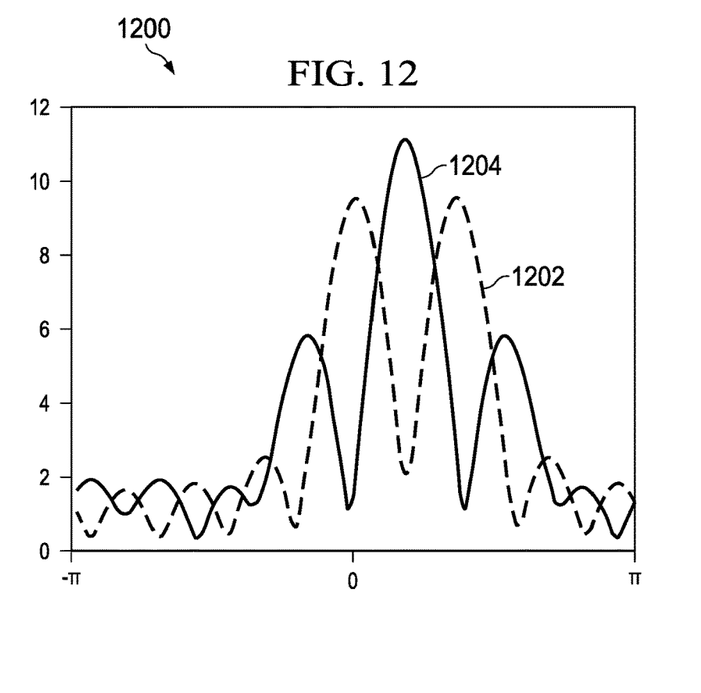
FIG. 12 is a graph showing Fourier transforms of an ideal and of erroneous corrected matrixes for two objects in a range-Doppler bin.

The techniques discussed hereinabove are computationally simple. However, these techniques can only detect and correct for velocity aliasing if there is only one dominant object in a range-Doppler bin. In an additional aspect of the present application, an alternate solution, which is computationally more involved, alleviates some of this restriction. With a scenario where there are N objects in the same range-Doppler bin, then the corrected virtual array signal $S_c$ would ideally consist of N complex tones and a frequency spectrum of $S_c$ will ideally reveal N peaks. However, the presence of objects with a relative velocity that exceeds $v_{max}$ will result in erroneous estimation of $\varphi_d$ and a consequent error ($\varphi_{error}$) in the phase $P_c$ of $S_c$. This generally manifests itself in additional peaks in the frequency spectrum of $S_c$. For example, for the radar architecture of FIG. 5, $\varphi_{error}=[0\ 0\ 0\ 0\ \pi\pi\pi\pi]$ which corresponds to a phase discontinuity of π in the phase of $S_c$. Graph 1200 of FIG. 12 illustrates this for the case of N=2. The ideal spectrum consists of two peaks as shown in curve 1202. The erroneous spectrum caused by $|v|>v_{max}$ includes additional peaks. This is shown for N=2 in curve 1204, which includes a total of 3 peaks. In an aspect, an error condition when N=2 is determined by:

1. Performing a spectral analysis on the corrected virtual array signal ($S_c$).
2. Constructing a second corrected virtual array signal ($S_c'$) by multiplying $S_c$ with $e^{-j\varphi_{error}}$ where $\varphi_{error}$ refers to the phase error vector. In addition, a spectral analysis on $S_c'$ is performed.
3. Comparing the results of the two spectral analyses in steps 1 and 2. Two approaches for this spectral analysis and comparison are possible Method 1 (FFT based spectral analysis): Perform an FFT on $S_c$ and $S_c'$ and estimate the number of peaks (for example, k and k') in each of the spectra. If k>k' it indicates an error condition (i.e. the presence of one or more objects with $|v|>v_{max}$). In practice, such a technique might be problematic because of the limited length of the FFT, SNR considerations etc. A more robust technique is Method 2 described below.

Method 2 (eigenvalue based analysis): Using eigenvalue based techniques estimate the number of objects (for example, m and m') corresponding to $S_c$ and $S_c'$. If m>m' it indicates an error condition (i.e. the presence of one or more objects with $|v|>v_{max}$). In many cases, the comparison of the number of estimated objects (m and m'), can be replaced by an appropriate comparison of the eigenvalues of the correlation matrix computed using $S_c$ and $S_c'$ as illustrated herein below.

The following is an example method based on Method 2:

Step 1: Ascertain the number of objects present in the range-Doppler bin by (a) computing the 3×3 correlation matrix R using all consecutive triads of $S_c$ that correspond to the same TX antenna and (b) estimating the eigenvalues of R and then estimating the number of objects using the relative values of these eigenvalues. If the number of objects is determined to be 1, then use the method described hereinabove regarding FIGS. 1-7. If the number of objects is determined to be 2, then follow the steps hereinbelow. If the number of objects is determined to be greater than 2 then the method terminates without a result.

Step 2: Let $r_k=[s_k\ s_{k+1}\ s_{k+2}]$. Compute the 3×3 correlation matrix of $S_c$ denoted by $R=\Sigma_{k=1:6}\ r_k r_k^T$ and compute the eigenvalues of R. $\lambda$ is equal to the smallest of these eigenvalues. Smoothing techniques such as the "forward-backward" smoothing technique that are known in literature can be used while computing $S_c$.

Step 3: Determine the correlation matrix R' of $S_c'$ using the process of Step 2 above. $\lambda'$ is equal to the smallest of the eigenvalues of R'.

Step 4: Compute the ratio $\lambda'/\lambda$ and compare this with two thresholds T1 and T2 that are determined experimentally or mathematically for a particular radar architecture.

If $\lambda'/\lambda>T1$, then there are no error conditions (i.e. both the objects have a velocity$<v_{max}$).

If $T1>\lambda'/\lambda>T2$, then one of the objects has a velocity$>v_{max}$.

If $\lambda'/\lambda<T1$, then both objects have a velocity$>v_{max}$.

In an example aspect, an integrated circuit includes at least two ports coupled to receive a plurality of chirps transmitted by at least two transmitters and reflected off an object and a processor. The processor is configured to estimate a velocity induced phase shift ($\varphi_d$) across chirps transmitted from one of the transmitters to one of the ports; select a virtual array vector S of signals received by each port corresponding to a sequence of chirps (frame) transmitted by each transmitter; correct the phases of each element of virtual array vector S using $\varphi_d$ to generate a corrected virtual array vector $S_c$; perform a first Fourier transform on the corrected virtual array vector $S_c$ to generate a corrected virtual array spectrum; and analyze the corrected virtual array spectrum to detect a signature that indicates that the object has an absolute velocity greater than a maximum velocity.

In another example aspect, the processor is further configured to correct the corrected virtual array vector $S_c$ using a phase error vector corresponding to the signature and perform a second Fourier transform on a resulting matrix to determine if the signature is removed from the resulting matrix.

In another example aspect, the processor further determines a correct velocity of the object.

In yet another example aspect, the correct velocity is determined using formulas:

$$v_{est} = \frac{\varphi_d \lambda}{4\pi T_c},$$

where $T_c$ is a chirp period and $\lambda$ is a wavelength of the chirps; and $v_{true}=v_{est}+2v_{max}$ (if $v_{est}<0$) or $v_{true}=v_{est}-2v_{max}$ (if $v_{est}>0$), where $v_{true}$ is the correct velocity and $v_{max}$ is determined by the formula $$v_{max} = \frac{\lambda}{4T_c}.$$

In another example aspect, integrated circuit includes four ports.

In another example aspect, the integrated circuit further includes circuitry for driving at least one of the at least two transmitters.

In another example, the processor further determines if the signature is caused by multiple objects by analyzing $S_c$.

In yet another example aspect, a method determines if a velocity of an object detected by a radar is greater than a maximum velocity by receiving on a plurality of receivers at least one frame of chirps transmitted by at least two transmitters and reflected off the object. A velocity induced phase shift ($\varphi_d$) across chirps transmitted from one of the transmitters to one of the receivers is estimated. A virtual array vector S of signals received by each receiver corresponding to one chirp transmitted by each transmitter is selected. Phases of each element of virtual array vector S are corrected using $\varphi_d$ to generate a corrected virtual array vector $S_c$. A first Fourier transform is performed on the corrected virtual array vector $S_c$ to generate a corrected virtual array spectrum and the corrected virtual array spectrum is analyzed to detect a signature that indicates that the object has an absolute velocity greater than a maximum velocity.

In yet another aspect, the corrected virtual array vector $S_c$ is corrected using a phase error vector corresponding the signature and a second Fourier transform on a resulting matrix is performed to determine if the signature is removed from the resulting matrix.

In another aspect, a correct velocity of the object is determined.

In another aspect, the correct velocity is determined using formulas $$v_{est} = \frac{\varphi_d \lambda}{4\pi T_c},$$

where $T_c$ is a chirp period and $\lambda$ is a wavelength of the chirps and $v_{true}=v_{est}+2v_{max}$ (if $v_{est}<0$) or $v_{true}=v_{est}-2v_{max}$ (if $v_{est}>0$), where $v_{true}$ is the correct velocity and $v_{max}$ is determined by the formula $$v_{max} = \frac{\lambda}{4T_c}.$$

In yet another aspect, there are four receivers.

In another aspect, it is determined if the signature is caused by multiple objects by analyzing $S_c$.

In another aspect, a radar system includes at least two transmitters configured to transmit a plurality of chirps. The system also includes at least two receivers receiving the chirps reflected off of an object and a processor. The processor is configured to: estimate a velocity induced phase shift ($\varphi_d$) across chirps transmitted from one of the transmitters to one of the receivers; select a virtual array vector S of signals received by each receiver corresponding to a sequence of chirps (frame) transmitted by each transmitter; correct the phases of each element of virtual array vector S using $\varphi_d$ to generate a corrected virtual array vector $S_c$; perform a first Fourier transform on the corrected virtual array vector $S_c$ to generate a corrected virtual array spectrum; and analyze the corrected virtual array spectrum to detect a signature that indicates that the object has an absolute velocity greater than a maximum velocity.

In yet another aspect, the processor is further configured to correct the corrected virtual array vector $S_c$ using a phase error vector corresponding to the signature and perform a second Fourier transform on a resulting matrix to determine if the signature is removed from the resulting matrix.

In yet another aspect, the processor further determines a correct velocity of the object.

In a further aspect, the correct velocity is determined using formulas $$v_{est} = \frac{\varphi_d \lambda}{4\pi T_c},$$

where $T_c$ is a chirp period and $\lambda$ is a wavelength of the chirps and $v_{true} = v_{est} + 2v_{max}$ (if $v_{est} < 0$) or $v_{true} = v_{est} - 2v_{max}$ (if $v_{est} > 0$), where $v_{true}$ is the correct velocity and $v_{max}$ is determined by the formula $$v_{max} = \frac{\lambda}{4T_c}.$$

In another aspect, the radar system includes four receivers.

In another aspect, the radar system includes four transmitters.

In yet another aspect, the processor is further configured to determine if the signature is caused by multiple objects by analyzing $S_c$.

Modifications are possible in the described example aspects, and other alternative arrangements are possible that are within the scope of the claims.

What is claimed is:

1. A circuit comprising:
   a port adapted to be coupled to a receiver and configured to receive a plurality of chirps;
   a processor coupled to the port and configured to:
   estimate a phase shift ($\varphi_d$) in a virtual array vector S of signals based on the plurality of chirps received by the port;
   correct the phases of each element of virtual array vector S using $\varphi_d$ to generate a corrected virtual array vector $S_c$;
   perform a first Fourier transform on the corrected virtual array vector $S_c$ to generate a corrected virtual array spectrum; and
   analyze the corrected virtual array spectrum to detect a signature that indicates that an object corresponding to the detected signature has an absolute velocity greater than a maximum velocity.

2. The circuit of claim 1 in which the processor is further configured to correct the corrected virtual array vector $S_c$ using a phase error vector corresponding to the detected signature and perform a second Fourier transform on a resulting matrix to determine if the signature is removed from the resulting matrix.

3. The circuit of claim 1 in which the processor is configured to calculate a velocity of the object using formulas $$v_{est} = \frac{\varphi_d \lambda}{4\pi T_c},$$

where $T_c$ is a chirp period and $\lambda$ is a wavelength of the chirps and $v_{true} = v_{est} + 2v_{max}$ (if $v_{est} < 0$) or $v_{true} = v_{est} - 2v_{max}$ (if $v_{est} > 0$), where $v_{true}$ is the correct velocity and $v_{max}$ is determined by the formula $$v_{max} = \frac{\lambda}{4T_c}.$$

4. The circuit of claim 1 in which the processor further determines if the signature is caused by multiple objects by analyzing $S_c$.

5. A method comprising:
   receiving, by a receiver, a plurality of chirps;
   estimating a phase shift ($\varphi_d$) in a virtual array vector S of signals received plurality of chirps;
   correcting phases of each element of virtual array vector S using $\varphi_d$ to generate a corrected virtual array vector $S_c$;
   performing a first Fourier transform on the corrected virtual array vector $S_c$ to generate a corrected virtual array spectrum; and
   analyzing the corrected virtual array spectrum to detect a signature that an object corresponding to the detected signature has an absolute velocity greater than a maximum velocity.

6. The method of claim 5 further comprising correcting the corrected virtual array vector $S_c$ using a phase error vector corresponding to the detected signature and performing a second Fourier transform on a resulting matrix to determine if the signature is removed from the resulting matrix.

7. The method of claim 5 further comprising determining a velocity of the object by using formulas $$v_{est} = \frac{\varphi_d \lambda}{4\pi T_c},$$

where $T_c$ is a chirp period and $\lambda$ is a wavelength of the chirps and $v_{true} = v_{est} + 2v_{max}$ (if $v_{est} < 0$) or $v_{true} = v_{est} - 2v_{max}$ (if $v_{est} > 0$), where $v_{true}$ is the correct velocity and $v_{max}$ is determined by the formula $$v_{max} = \frac{\lambda}{4T_c}.$$

8. The method of claim 5 further comprising determining if the signature is caused by multiple objects by analyzing $S_c$.

9. A radar system comprising:
a receiver configured to receive a plurality of chirps;
a processor coupled to the receiver and configured to:
estimate a phase shift ($\varphi_d$) in a virtual array vector S of signals based on the received plurality of chips;
correct the phases of each element of virtual array vector S using $\varphi_d$ to generate a corrected virtual array vector $S_c$;
perform a first Fourier transform on the corrected virtual array vector $S_c$ to generate a corrected virtual array spectrum; and
analyze the corrected virtual array spectrum to detect a signature that indicates that an object corresponding to the detected signature has an absolute velocity greater than a maximum velocity.

10. The radar system of claim 9 in which the processor is further configured to correct the corrected virtual array vector $S_c$ using a phase error vector corresponding the signature and perform a second Fourier transform on a resulting matrix to determine if the signature is removed from the resulting matrix.

11. The radar system of claim 9 in which the processor further determines a velocity of the object.

12. The radar system of claim 11 in which the processor further determines a velocity of the object using formulas $$v_{est} = \frac{\varphi_d \lambda}{4\pi T_c},$$

where $T_c$ is a chirp period and $\lambda$ is a wavelength of the chirps and $v_{true} = v_{est} + 2v_{max}$ (if $v_{est} < 0$) or $v_{true} = v_{est} - 2v_{max}$ (if $v_{est} > 0$), where $v_{true}$ is the correct velocity and $v_{max}$ is determined by the formula $$v_{max} = \frac{\lambda}{4T_c}.$$

13. The radar system of claim 9 in which the processor is further configured to determine if the signature is caused by multiple objects by analyzing $S_c$.

* * * * *